United States Patent
Karaoguz et al.

(10) Patent No.: US 8,893,186 B2
(45) Date of Patent: *Nov. 18, 2014

(54) MEDIA PROCESSING SYSTEM BASED ON SATELLITE SET TOP BOX PLATFORM WITH TELEPHONY DOWNSTREAM AND UPSTREAM DATA PATHS

(75) Inventors: Jeyhan Karaoguz, Irvine, CA (US); James D. Bennett, Hroznetin (CZ)

(73) Assignee: Broadcom Corporation, Irvine, CA (US)

(*) Notice: Subject to any disclaimer, the term of this patent is extended or adjusted under 35 U.S.C. 154(b) by 1034 days.

This patent is subject to a terminal disclaimer.

(21) Appl. No.: 12/898,062

(22) Filed: Oct. 5, 2010

(65) Prior Publication Data

US 2011/0113460 A1    May 12, 2011

Related U.S. Application Data

(63) Continuation of application No. 12/268,041, filed on Nov. 10, 2008, now Pat. No. 7,808,901, which is a (Continued)

(51) Int. Cl.
| | |
|---|---|
| H04N 5/445 | (2011.01) |
| H04N 21/258 | (2011.01) |
| H04N 21/482 | (2011.01) |
| H04N 21/2343 | (2011.01) |
| H04N 21/222 | (2011.01) |

(Continued)

(52) U.S. Cl.
CPC .......... *H04L 67/06* (2013.01); *H04N 21/25808* (2013.01); *H04N 21/4826* (2013.01); *H04N 21/2343* (2013.01); *H04N 21/222* (2013.01); *H04N 21/42684* (2013.01); *H04N 21/44222* (2013.01); *H04N 21/4856* (2013.01); *H04N 21/4668* (2013.01); *H04N 21/2668* (2013.01);

(Continued)

(58) Field of Classification Search
USPC ...................................................... 725/47, 48
See application file for complete search history.

(56) References Cited

U.S. PATENT DOCUMENTS

| | | |
|---|---|---|
| 5,721,815 A | 2/1998 | Ottesen et al. |
| 5,721,878 A | 2/1998 | Ottesen et al. |

(Continued)

FOREIGN PATENT DOCUMENTS

| | | |
|---|---|---|
| WO | WO 01/19084 A1 | 3/2001 |
| WO | WO 01/31472 A1 | 5/2001 |

(Continued)

OTHER PUBLICATIONS

European Search Report for Application No. 04001226.2, mailed Sep. 3, 2007.

(Continued)

*Primary Examiner* — Nasser Goodarzi
*Assistant Examiner* — Mike Hong
(74) *Attorney, Agent, or Firm* — Brinks Gilson & Lione

(57) ABSTRACT

Systems and methods that provide satellite-based media processing are described. In one embodiment, a system that exchanges media may include, for example, a communications device that may be coupled to a network and to an antenna. The communications device may provide two-way communications with the network and may provide one-way communications with the antenna. The communications may receive media content from the antenna and/or the network. The communications device may send the media content to the network.

20 Claims, 14 Drawing Sheets

Related U.S. Application Data continuation of application No. 10/674,671, filed on Sep. 30, 2003, now Pat. No. 7,450,501.

(60) Provisional application No. 60/467,097, filed on Apr. 30, 2003, provisional application No. 60/457,179, filed on Mar. 25, 2003, provisional application No. 60/443,894, filed on Jan. 30, 2003, provisional application No. 60/432,472, filed on Dec. 11, 2002.

(51) Int. Cl.

| | |
|---|---|
| *H04N 21/426* | (2011.01) |
| *H04N 21/442* | (2011.01) |
| *H04N 21/485* | (2011.01) |
| *H04N 21/466* | (2011.01) |
| *H04N 21/2668* | (2011.01) |
| *H04N 21/6402* | (2011.01) |
| *H04N 7/173* | (2011.01) |
| *H04N 21/414* | (2011.01) |
| *H04N 21/254* | (2011.01) |
| *H04N 21/475* | (2011.01) |
| *H04N 21/63* | (2011.01) |
| *H04N 21/472* | (2011.01) |
| *H04N 7/18* | (2006.01) |
| *H04N 7/16* | (2011.01) |
| *H04N 21/4363* | (2011.01) |
| *H04N 21/658* | (2011.01) |
| *H04L 29/08* | (2006.01) |
| *H04N 21/4227* | (2011.01) |
| *H04N 21/433* | (2011.01) |
| *H04N 21/431* | (2011.01) |
| *H04N 21/2743* | (2011.01) |
| *H04N 21/61* | (2011.01) |
| *H04N 21/6587* | (2011.01) |
| *H04N 21/2543* | (2011.01) |
| *H04N 21/81* | (2011.01) |
| *H04N 21/6583* | (2011.01) |
| *H04N 21/4782* | (2011.01) |
| *H04L 29/06* | (2006.01) |
| *H04N 21/262* | (2011.01) |
| *H04N 21/24* | (2011.01) |
| *H04N 21/4143* | (2011.01) |
| *H04N 21/436* | (2011.01) |
| *H04N 21/84* | (2011.01) |
| *H04N 21/2747* | (2011.01) |
| *H04N 21/462* | (2011.01) |
| *H04N 21/231* | (2011.01) |
| *H04N 21/4223* | (2011.01) |
| *H04N 21/4627* | (2011.01) |
| *H04N 21/4788* | (2011.01) |
| *H04N 7/14* | (2006.01) |
| *H04N 21/45* | (2011.01) |
| *H04N 21/41* | (2011.01) |
| *H04N 21/4786* | (2011.01) |
| *H04N 21/458* | (2011.01) |
| *H04N 21/488* | (2011.01) |
| *H04N 21/422* | (2011.01) |
| *H04L 12/28* | (2006.01) |

(52) U.S. Cl.
CPC ...... *H04N 21/6402* (2013.01); *H04N 7/17309* (2013.01); *H04N 21/41407* (2013.01); *H04N 21/254* (2013.01); *H04N 21/4828* (2013.01); *H04N 21/4755* (2013.01); *H04N 21/632* (2013.01); *H04N 21/4753* (2013.01); *H04N 20/38* (2013.01); *H04N 21/47214* (2013.01); *H04N 7/18* (2013.01); *H04N 7/163* (2013.01); *H04N 21/43637* (2013.01); *H04N 21/6581* (2013.01); *H04N 21/4821* (2013.01); *H04L 67/325* (2013.01); *H04N 21/4227* (2013.01); *H04N 21/4331* (2013.01); *H04N 21/4316* (2013.01); *H04N 21/4751* (2013.01); *H04N 21/4334* (2013.01); *H04N 21/2743* (2013.01); *H04L 67/327* (2013.01); *H04N 21/41422* (2013.01); *H04N 21/6143* (2013.01); *H04N 21/6587* (2013.01); *H04N 21/2543* (2013.01); *H04N 21/8113* (2013.01); *H04N 21/6583* (2013.01); *H04N 21/25435* (2013.01); *H04N 21/4782* (2013.01); *H04N 21/2541* (2013.01); *H04N 21/25891* (2013.01); *H04L 65/1073* (2013.01); *H04N 21/43632* (2013.01); *H04N 21/6582* (2013.01); *H04N 21/812* (2013.01); *H04N 21/26266* (2013.01); *H04N 21/258* (2013.01); *H04N 21/482* (2013.01); *H04N 21/2408* (2013.01); *H04L 12/2834* (2013.01); *H04N 21/4143* (2013.01); *H04N 21/43615* (2013.01); *H04N 7/17318* (2013.01); *H04N 21/84* (2013.01); *H04L 29/06027* (2013.01); *H04N 21/2747* (2013.01); *H04N 21/814* (2013.01); *H04N 21/4622* (2013.01); *H04L 2012/2845* (2013.01); *H04N 21/23106* (2013.01); *H04N 21/4223* (2013.01); *H04N 21/4627* (2013.01); *H04N 21/25875* (2013.01); *H04N 21/4314* (2013.01); *H04L 65/4076* (2013.01); *H04N 21/8146* (2013.01); *H04N 21/4788* (2013.01); *H04L 12/2803* (2013.01); *H04N 7/141* (2013.01); *H04N 21/442* (2013.01); *H04N 21/4532* (2013.01); *H04N 21/4126* (2013.01); *H04L 67/306* (2013.01); *H04N 21/436* (2013.01); *H04L 65/4084* (2013.01); *H04N 21/25833* (2013.01); *H04N 21/4786* (2013.01); *H04N 21/458* (2013.01); *H04N 21/6187* (2013.01); *H04N 21/4758* (2013.01); *H04N 21/4882* (2013.01); *H04N 21/234363* (2013.01); *H04N 21/422* (2013.01); *H04N 21/47202* (2013.01); *H04N 21/6125* (2013.01); *H04N 21/4312* (2013.01); *H04N 7/17336* (2013.01)
USPC ............................................. 725/47; 725/48

(56) References Cited

U.S. PATENT DOCUMENTS

| | | |
|---|---|---|
| 5,841,990 A | 11/1998 | Picazo et al. |
| 5,896,382 A | 4/1999 | Davis et al. |
| 5,917,997 A | 6/1999 | Bell et al. |
| 5,926,478 A | 7/1999 | Ghaibeh et al. |
| 5,930,493 A | 7/1999 | Ottesen et al. |
| 5,974,453 A | 10/1999 | Anderson et al. |
| 6,141,688 A | 10/2000 | Bi et al. |
| 6,233,428 B1 | 5/2001 | Fryer |
| 6,249,523 B1 | 6/2001 | Hrastar et al. |
| 6,272,129 B1 | 8/2001 | Dynarski et al. |
| 6,349,324 B1 | 2/2002 | Tokoro |
| 6,480,889 B1 | 11/2002 | Saito et al. |
| 6,563,816 B1 | 5/2003 | Nodoushani et al. |
| 6,591,306 B1 | 7/2003 | Redlich |
| 6,631,247 B1 | 10/2003 | Motoyama et al. |
| 6,636,499 B1 | 10/2003 | Dowling |
| 6,643,658 B1 | 11/2003 | Jai et al. |
| 6,654,796 B1 | 11/2003 | Siater et al. |
| 6,665,020 B1 | 12/2003 | Stahl et al. |
| 6,686,838 B1 | 2/2004 | Rezvani et al. |
| 6,693,896 B1 | 2/2004 | Utsumi et al. |
| 6,728,239 B1 | 4/2004 | Kung et al. |

(56) References Cited

U.S. PATENT DOCUMENTS

| | | |
|---|---|---|
| 6,735,619 B1 | 5/2004 | Sawada |
| 6,760,762 B2 | 7/2004 | Pezzutti |
| 6,763,454 B2 | 7/2004 | Wilson et al. |
| 6,774,926 B1 | 8/2004 | Ellis et al. |
| 6,823,454 B1 | 11/2004 | Hind et al. |
| 6,857,009 B1 | 2/2005 | Ferreria et al. |
| 6,889,385 B1 | 5/2005 | Rakib et al. |
| 6,901,439 B1 | 5/2005 | Bonasia et al. |
| 6,934,754 B2 | 8/2005 | West et al. |
| 6,941,356 B2 | 9/2005 | Meyerson |
| 6,950,875 B1 | 9/2005 | Slaughter et al. |
| 6,963,358 B2 | 11/2005 | Cohen et al. |
| 6,965,581 B2 | 11/2005 | Nguyen et al. |
| 6,968,394 B1 | 11/2005 | El-Rafie |
| 6,982,953 B1 | 1/2006 | Swales |
| 6,996,628 B2 | 2/2006 | Keane et al. |
| 7,003,795 B2 | 2/2006 | Allen |
| 7,010,303 B2 | 3/2006 | Lewis et al. |
| 7,020,694 B2 | 3/2006 | Saito et al. |
| 7,035,271 B1 | 4/2006 | Peterson |
| 7,039,391 B2 | 5/2006 | Rezvani et al. |
| 7,055,104 B1 | 5/2006 | Billmaier et al. |
| 7,065,778 B1 | 6/2006 | Lu |
| 7,069,312 B2 | 6/2006 | Kostic et al. |
| 7,075,573 B2 | 7/2006 | Imaeda |
| 7,079,527 B2 | 7/2006 | Owens |
| 7,080,400 B1 | 7/2006 | Navar |
| 7,114,070 B1 | 9/2006 | Willming et al. |
| 7,130,895 B2 | 10/2006 | Zintel et al. |
| 7,165,109 B2 | 1/2007 | Chiloyan et al. |
| 7,197,550 B2 | 3/2007 | Cheline et al. |
| 7,213,061 B1 | 5/2007 | Hite et al |
| 7,234,117 B2 | 6/2007 | Zaner et al. |
| 7,243,132 B2 | 7/2007 | Choi |
| 7,243,141 B2 | 7/2007 | Harris |
| 7,272,137 B2 | 9/2007 | Unitt et al. |
| 7,280,546 B1 | 10/2007 | Sharma et al. |
| 7,296,283 B2 | 11/2007 | Hrastar et al. |
| 7,299,304 B2 | 11/2007 | Saint-Hilaire et al. |
| 7,299,488 B2 | 11/2007 | Brodigan et al. |
| 7,302,487 B2 | 11/2007 | Yionen et al. |
| 7,308,575 B2 | 12/2007 | Basil et al. |
| 7,313,384 B1 | 12/2007 | Meenan et al. |
| 7,313,606 B2 | 12/2007 | Donahue et al. |
| 7,316,022 B2 | 1/2008 | Nishio |
| 7,328,266 B2 | 2/2008 | Schmidt et al. |
| 7,349,967 B2 | 3/2008 | Wang |
| 7,370,091 B1 | 5/2008 | Slaughter et al. |
| 7,450,501 B2 | 11/2008 | Karaoguz et al. |
| 7,496,647 B2 | 2/2009 | Karaoguz et al. |
| 7,496,665 B2 | 2/2009 | Karaoguz et al. |
| 7,734,788 B2 | 6/2010 | Karaoguz et al. |
| 7,808,901 B2 | 10/2010 | Karaoguz et al. |
| 2001/0004768 A1 | 6/2001 | Hodge et al. |
| 2001/0030785 A1 | 10/2001 | Pangrac et al. |
| 2002/0016971 A1 | 2/2002 | Berezowski |
| 2002/0042924 A1 | 4/2002 | Adams |
| 2002/0078161 A1 | 6/2002 | Cheng |
| 2002/0104093 A1 | 8/2002 | Buehl et al. |
| 2002/0116464 A1 | 8/2002 | Mak |
| 2002/0152311 A1 | 10/2002 | Veltman et al. |
| 2003/0004916 A1 | 1/2003 | Lewis |
| 2003/0043272 A1 | 3/2003 | Nagao et al. |
| 2003/0056008 A1 | 3/2003 | Russell et al. |
| 2003/0061315 A1 | 3/2003 | Jin |
| 2003/0078968 A1 | 4/2003 | Needham et al. |
| 2003/0079124 A1 | 4/2003 | Serebrennikov |
| 2003/0081619 A1 | 5/2003 | Phillips et al. |
| 2003/0084173 A1 | 5/2003 | Deleu et al. |
| 2003/0115585 A1 | 6/2003 | Barsness |
| 2003/0154285 A1 | 8/2003 | Berglund et al. |
| 2003/0225864 A1 | 12/2003 | Gardiner et al. |
| 2004/0003040 A1 | 1/2004 | Beavers et al. |
| 2004/0003051 A1 | 1/2004 | Krzyzanowski et al. |
| 2004/0045035 A1 | 3/2004 | Cummings |
| 2004/0114630 A1 | 6/2004 | Karaoguz et al. |
| 2004/0117834 A1 | 6/2004 | Karaoguz et al. |
| 2004/0117845 A1 | 6/2004 | Karaoguz et al. |
| 2004/0117846 A1 | 6/2004 | Karaoguz et al. |
| 2004/0243671 A9 | 12/2004 | Needham et al. |
| 2005/0028208 A1 | 2/2005 | Ellis et al. |
| 2007/0174886 A1 | 7/2007 | Scheuer et al. |
| 2007/0198738 A1 | 8/2007 | Angiolillo et al. |
| 2009/0138928 A1 | 5/2009 | Karaoguz et al. |
| 2009/0157808 A1 | 6/2009 | Karaoguz et al. |
| 2009/0282098 A1 | 11/2009 | Karaoguz et al. |
| 2010/0245606 A1 | 9/2010 | Karaoguz et al. |

FOREIGN PATENT DOCUMENTS

| | | |
|---|---|---|
| WO | WO 01/46818 A1 | 6/2001 |
| WO | WO 01/71983 | 9/2001 |
| WO | WO 02/30116 A1 | 4/2002 |

OTHER PUBLICATIONS

European Search Report for Application No. 04001227.0, mailed Nov. 21, 2005.

Moh, M. et al., Mobile IP Technology: Mobility Support of SIP, Computer Communications and Networks, 1999, Proceedings, Eighth International Conference in Boston, MA, USA, Oct. 11-13, 1999, Piscataway, NJ, USA, IEEE, Oct. 11, 1999, pp. 554-559, XP010359588 ISBN: 0-7803-5794-9.

Schulzrine, H. et al., Application-Layer Mobility Using SIP, Service Portability and Virtual Customer Environments, 2000 IEEE San Francisco, CA, USA, Dec. 1, 2000, Piscataway, NJ, USA, IEEE, pp. 29-36, XP010551460, ISBN: 0-7803-7133-X.

Share It! Deliverable #3, Nov. 30, 2002, pp. 1-93.

Tokmakoff, A. et al., Home Media Server Content Management, Proceedings of the Spie, Bellinghan, VA, US vol. 4519, Aug. 22, 2001, pp. 168-179, XP009017768, ISSN: 02770786X.

Communication pursuant to Article 94(3) EPC for European Patent Application No. 04 001 227 .02413, Dec. 11, 2009.

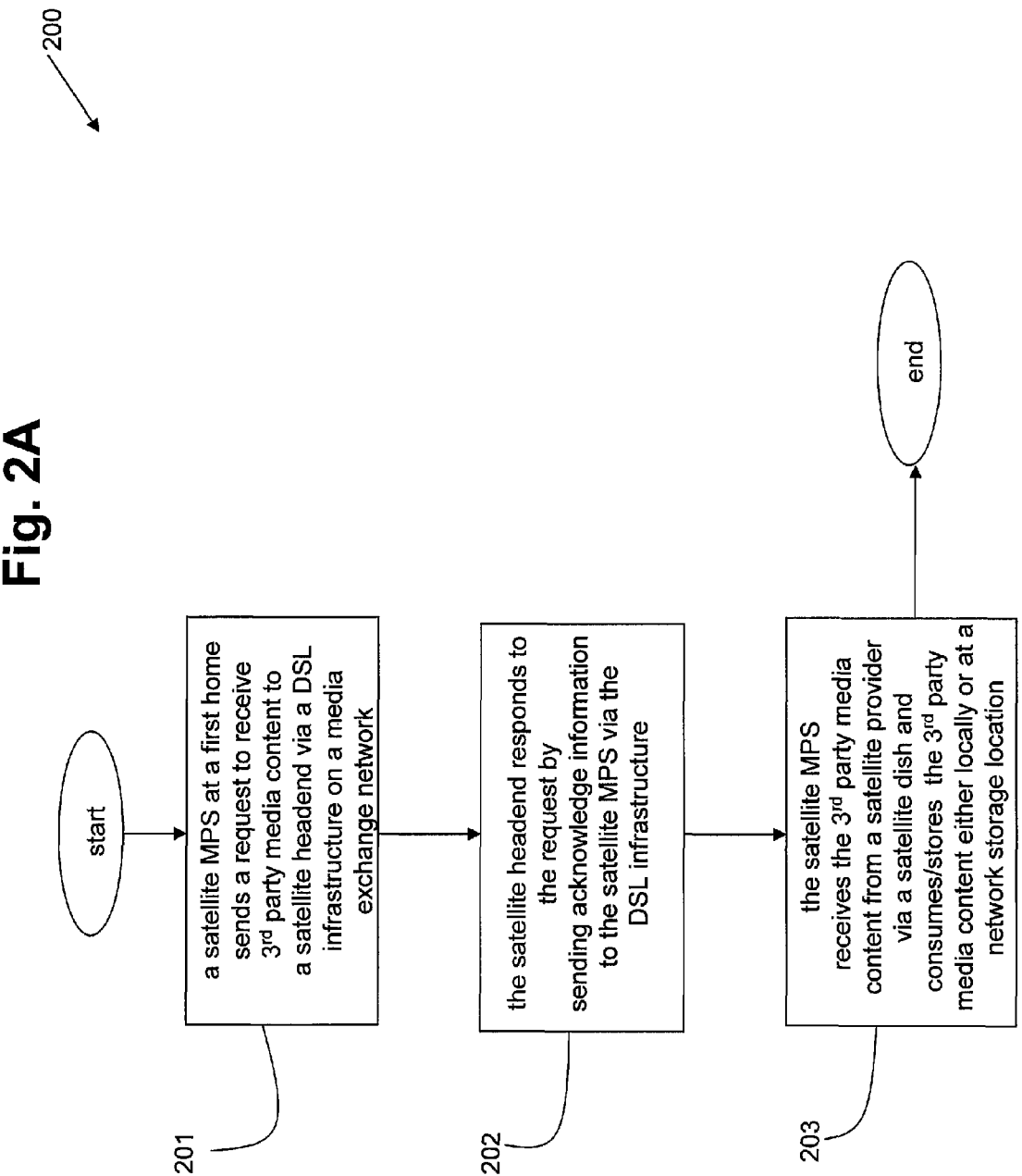

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | | Express Estimated Delivery Time: 18 min Cost: $1.2 (with Queuing) | | Showing All Day (48 Min), Earliest Order Time: 4:00PM MPEG-2 4 Mbps | |
| VACATION in ALASKA VIDEO 804 | | | Overnight Delivery: Avail. Nxt Morning Cost: 5c (Server Stored) | Showing All Day (48 Min), Earliest Order Time: 4:00PM MPEG-2 19 Mbps | |

Fig. 8

MEDIA PROCESSING SYSTEM BASED ON SATELLITE SET TOP BOX PLATFORM WITH TELEPHONY DOWNSTREAM AND UPSTREAM DATA PATHS

CROSS-REFERENCE TO RELATED APPLICATIONS/INCORPORATION BY REFERENCE

The present application is a CONTINUATION of U.S. application Ser. No. 12/268,041, filed Nov. 10, 2008, which is a CONTINUATION of U.S. application Ser. No. 10/674,671, filed Sep. 30, 2003, now U.S. Pat. No. 7,450,051. Said U.S. application Ser. No. 10/674,671 makes reference to, claims priority to and claims benefit from U.S. Application No. 60/467,097, entitled "Media Processing System Based on Satellite Set Top Box Platform with Telephony Downstream and Upstream Data Paths" and filed on Apr. 30, 2003; U.S. Application No. 60/457,179, entitled "Server Architecture Supporting a Personal Media Exchange Network" and filed on Mar. 25, 2003; U.S. Application No. 60/432,472, entitled "Personal Inter-Home Media Exchange Network" and filed on Dec. 11, 2002; and U.S. Application No. 60/443,894, entitled "Access and Control of Media Peripherals Via a Media Processing System" and filed on Jan. 30, 2003.

In addition, said U.S. application Ser. No. 10/674,671 makes reference to U.S. application Ser. No. 10/657,390, now issued U.S. Pat. No. 7,496,647, entitled "Personal Inter-Home Media Exchange Network" and filed on Sep. 8, 2003; and U.S. application Ser. No. 10/660,267, entitled "Personal Access and Control of Media Peripherals on a Media Exchange Network" and filed on Sep. 11, 2003, now U.S. Pat. No. 7,496,665.

This application is also related to U.S. application Ser. No. 10/675,443, filed Sep. 30, 2003; U.S. application Ser. No. 12/392,074, filed Feb. 24, 2009; U.S. application Ser. No. 12/391,022, filed Feb. 23, 2009, now U.S. Pat. No. 7,734,788; and U.S. application Ser. No. 12/795,405, filed Jun. 7, 2010.

The above-identified applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The ways in which digital media are shared today are somewhat limited. Today, there are two primary ways that people exchange digital media. A first way is a fairly interactive way using a personal computer (PC) having an upstream and downstream connection to, for example, the Internet.

An Internet service provider (ISP) may provide temporary Internet protocol (IP) addresses to PC's connected to the Internet using, for example, dynamic host configuration protocol (DHCP). The PC's may then access web pages on the Internet using a web browser and send and receive email with or without file attachments to exchange media, data, and services between PC's. Files may also be transferred over the Internet using a file transfer protocol (FTP). FTP allows PC's connected to the Internet to exchange files, independently of the PC platform.

A user of a PC may connect a device, for example, a digital camera or an MP3 player to his PC and download digital files from the device to the PC. Such a device may interface to a PC through a Universal Serial Bus (USB) interface to exchange digital media between a PC and the device. Again, the digital files may be attached to emails and shared with others in such a manner.

A user may have access to digital broadcast media through a set-top box providing predominantly one-way communication (i.e., broadcast media is sent from a broadcast media provider to the set-top box). A user of a set-top box may also be able to order pay per view (PPV) broadcast channels via the set-top box, but interaction between the user and the set-top box is, otherwise, very limited. A set-top box may interface to a cable infrastructure, a satellite infrastructure or a digital subscriber line (DSL) infrastructure to receive broadcast media and to exchange access information between the infrastructure and the set-top box.

Further limitations and disadvantages of conventional and traditional approaches will become apparent to one of skill in the art, through comparison of such systems with aspects of the present invention as set forth in the remainder of the present application with reference to the drawings.

BRIEF SUMMARY OF THE INVENTION

Aspects of the present invention may be found in, for example, systems and methods that provide satellite-based media processing with telephony. In one embodiment, the present invention may provide a system that exchanges media content. The system may include, for example, a communications device that may be coupled to a network and to an antenna. The communications device may provide two-way communications with the network and may provide one-way communications with the antenna. The communications may receive media content from the antenna and/or the network. The communications device may send the media content to the network.

In another embodiment, aspects of the present invention may provide a method that exchanges media content. The method may include, for example, one or more of the following: adapting a communications device to provide two-way communications with a network; adapting the communications device to provide one-way communications with an antenna; receiving, by the communications device, media content from the antenna; receiving, by the communications device, the media content from the network; and sending, by the communications device, the media content to the network.

These and other advantages, aspects and novel features of the present invention, as well as details of illustrated embodiments thereof, will be more fully understood from the following description and drawings.

BRIEF DESCRIPTION OF THE DRAWINGS

FIG. 2A is a flowchart illustrating an embodiment of a method supporting a media processing system of a media exchange network according to the present invention.

FIG. 8 illustrates an embodiment of a TV guide channel user interface showing several options of a pushed media according to present invention.

DETAILED DESCRIPTION OF THE INVENTION

Some embodiments of the present invention may relate to providing a network for media exchange. Some embodiments of the present invention may relate to providing a media exchange network supporting a media processing system based on a satellite set-top box platform with telephony downstream and upstream data paths.

Figure 1:
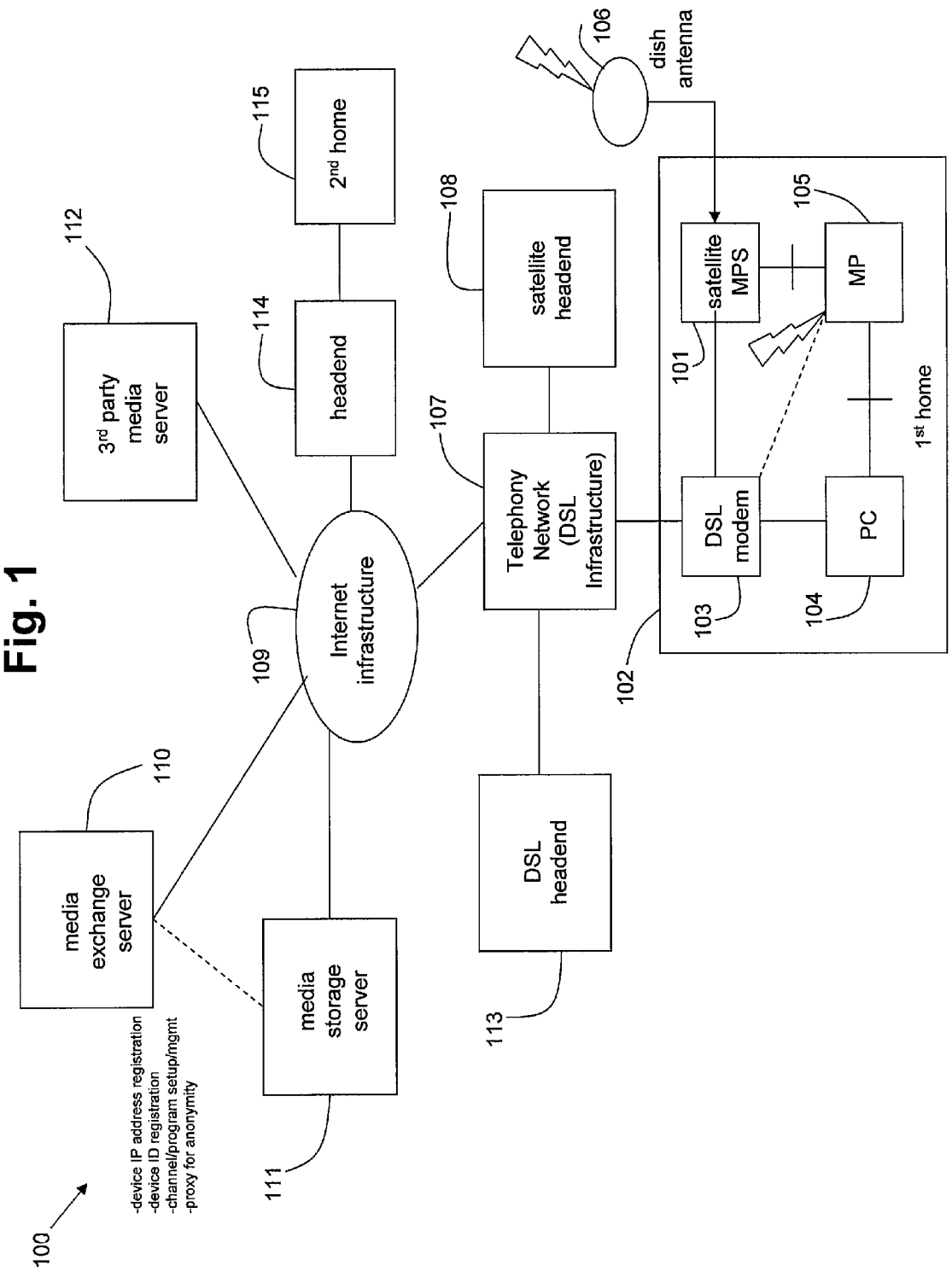
FIG. 1 is a diagram illustrating an embodiment of a media exchange network supporting a media processing system based on a satellite set-top box platform with telephony according to the present invention.

FIG. 1 is a diagram illustrating an embodiment of a media exchange network 100 supporting a media processing system (MPS) 101 based on a satellite set-top box platform with telephony downstream and upstream data paths according to the present invention.

In accordance with various embodiments of the present invention, an MPS may comprise, for example, at least one of a set-top box, a personal computer (PC) and a television (TV) with a media management system (MMS). An MMS is also known herein as a media exchange software (MES) platform.

In accordance with various embodiments of the present invention, an MMS may comprise a software platform operating on at least one processor to provide certain functionality including, for example, user interface functionality, distributed storage functionality and networking functionality. For example, an MMS may provide control of media peripheral devices, status monitoring of media peripheral devices and inter-home MPS routing selection in accordance with an embodiment of the present invention.

The media exchange network 100 may include a communication network comprising, for example, a satellite MPS 101, a PC 104, a media peripheral (MP) 105, and a digital subscriber line (DSL) modem 103 at a $1^{st}$ home 102. The DSL modem 103 interfaces to the satellite MPS 101 and the PC 104. The MP 105 interfaces to the satellite MPS 101 and the PC 104 via, for example, universal serial bus (USB) connections or other types of wire connections (e.g., cable connections). Optionally, the MP 105 may interface to the PC 104 and/or the MPS 101 via a wireless link. The media exchange network 100 may also comprise a satellite dish antenna 106 interfacing to the satellite MPS 101 at the $1^{st}$ home 102.

The media exchange network 100 may further comprise, for example, an Internet infrastructure 109, a media exchange server 110, a DSL infrastructure 107, a DSL headend 113, and a satellite headend 108. The media exchange network 100 may also comprise a media storage server 111 and a $3^{rd}$ party media server 112. The DSL headend 113 and the satellite headend 108 may interface to the Internet infrastructure 109 via the DSL infrastructure 107. The media storage server 111, the media exchange server 110, and the $3^{rd}$ party media server 112 each may interface to the Internet infrastructure 109. The DSL infrastructure 107 may interface to the DSL modem 103 at the $1^{st}$ home 102. The satellite headend 108 and the DSL headend 113 may interface to the DSL infrastructure 107. In some embodiments according to the present invention, the media storage server 111 may interface with the media exchange network 110. In various embodiments according to the present invention, the PC 104, MPS 101, and/or the MP 105 may include an internal DSL modem to communicate with the DSL infrastructure 107.

The media exchange network 100 may further comprise, for example, a headend 114 and a $2^{nd}$ home 115. The headend 114 may comprise, for example, a satellite headend, a cable headend, or a DSL headend. The $2^{nd}$ home 115 may include, for example, an MPS, a PC, an MP, and modems in accordance with various embodiments of the present invention. A device (e.g., a cable modem or a DSL modem) at the $2^{nd}$ home 115 may interface to the Internet infrastructure 109 via the headend 114.

The architecture of FIG. 1, for example, may provide communication between a device (e.g., an MPS, a PC, an MP) at one home and a satellite provider over the media exchange network 100. The media exchange server 110 provides functionality on the media exchange network 100 including, for example, device registration, channel/program setup and management, and security.

In accordance with an embodiment of the present invention, the satellite headend 108, the DSL headend 113 and/or the headend 114 may be upgraded to media exchange headends by adding functionality to facilitate the exchange of media on the media exchange network 100 in conjunction with the media exchange server 110. Such functionality may include, for example, distributed networking capability, archival functionality (e.g., long term media storage), temporary storage (e.g., to aid in the distribution and routing of media), storage management, and digital rights management.

Some elements of the media exchange network 100 may include, for example, storage locations for digital media and data in accordance with various embodiments of the present invention. The storage locations may comprise, for example, hard disk drives, a DVD player, a CD player, floppy disk drives, a RAM, or any combination of these. The storage locations may also include, for example, memory sticks, PCMCIA cards, compact flash cards, or any combination of these.

The PC 104 may comprise, for example, a desktop PC, a notebook PC, a personal digital assistant (PDA), or any computing device. The media peripheral 105 may include, for example, a digital camera, a digital camcorder, an MP3 player, a home juke-box system, a PDA, and a multi-media gateway device.

In accordance with some embodiments of the present invention, the satellite MPS 101 may comprise an enhanced satellite set-top box. The MPS 101 may include, for example, a TV screen that can be used for viewing and interacting with various user interfaces, media, data, and services that are available on the media exchange network 100 using, for example, a remote control. The PC 104 may include, for example, a PC monitor for viewing and interacting with various user interfaces, media, data, and services that are available on the media exchange network 100 using, for example, a keyboard and a mouse. The MPS 101, the PC 104, and/or the MP 105 may include, for example, functional software to support interaction with the headends 108 and 113 and the media exchange server 110 on the media exchange network 100 in accordance with various embodiments of the present invention.

The MPS 101 may support a satellite downstream communication link for legacy network programming via the dish antenna 106. The pushing and pulling of digital media and data are supported through the use of the DSL modem 103 in accordance with an embodiment of the present invention. In some embodiments of the present invention, the telephony network 107 may comprise a dial-up network and the modem 103 may comprise a dial-up modem.

The satellite headend 108 may comprise, for example, a high-end DSL modem with supporting infrastructure (e.g., upconverters/modulators, a router/firewall, an intranet infrastructure, etc.) and may be operated by a satellite provider company. The satellite headend 108 may be able to communicate to users via the DSL infrastructure 107 which may comprise a telephony network to transmit information along twisted pairs of copper wires according to some embodiments of the present invention. A user at the $1^{st}$ home 102 may receive broadcast media transmitted from a satellite in space to the dish antenna 106. The dish antenna 106 may receive the satellite signal and may make it available to the satellite MPS 101. Bi-directional communications (e.g., command data) between the $1^{st}$ home 102 and the satellite headend 108 takes place via, for example, the DSL infrastructure 107.

The DSL headend 113 may comprise, for example, a high-end DSL modem with supporting infrastructure (e.g., upconverters/modulators, a router/firewall, an intranet infrastructure, etc.) and may be operated by a DSL provider company. Command and control data, for example, may be communicated bi-directionally between the $1^{st}$ home 102 and the DSL headend 113.

In accordance with an embodiment of the present invention, some or all of the functionality of the media exchange server 110 may be distributed throughout the various elements of the media exchange network 100. For example, referring to FIG. 1, the functionality of the media exchange server 110 may be distributed into any combination of devices on the media exchange network 100 including, for example, the PC 104, the satellite MPS 101, the satellite headend 108, the DSL headend 113, the headend 114, and/or devices within the $2^{nd}$ home 115.

The media exchange server 110 in the media exchange network 100 may be jointly managed and accessed by the operators of the satellite headend 108 and the DSL headend 113 for program content, device registration, user authentication, billing, etc., in accordance with an embodiment of the present invention.

Other embodiments of the present invention may comprise various combinations and/or multiple instantiations of the elements of FIG. 1, in accordance with the present invention.

In accordance with some embodiments of the present invention, the DSL modem 103 may provide an upstream path and a downstream path through the telephony network 107 within the media exchange network 100 combined with a digital satellite downstream path from a satellite in space to the dish antenna 106. Some or all of the functions of the media exchange network 100 may be performed using the satellite MPS 101. The media content (e.g., personal media content) and $3^{rd}$ party media content may be communicated between the satellite MPS 101 and other elements of the media exchange network 100 via the DSL infrastructure.

$3^{rd}$ party media content may be ordered through the DSL infrastructure 107 from the satellite headend 108. The satellite headend 108 may then command that the $3^{rd}$ party media be piped from a satellite in space to the dish antenna 106. The satellite in space may provide an MPEG transport stream via a downstream path to the dish antenna 106. In accordance with an embodiment of the present invention, the MPEG transport stream may include, for example, broadcast video channels, interleaved data streams, interleaved $3^{rd}$ party media content, and an interleaved media guide. The satellite MPS 101 may process the various content within the MPEG transport stream.

In accordance with some embodiments of the present invention, the functionality that a cable MPS, in conjunction with a cable modem, may perform with respect to the media exchange network may also be performed by a satellite MPS in conjunction with a DSL modem as described in, for example, U.S. Patent Application Ser. No. 60/457,179, entitled "Server Architecture Supporting a Personal Media Exchange Network" and filed on Mar. 25, 2003, which has been incorporated herein by reference in its entirety.

FIG. 2A is a flowchart illustrating an embodiment of a method 200 supporting the media processing system 101 of the media exchange network 100 of FIG. 1, in accordance with various aspects of the present invention. In step 201, a satellite MPS at a first home sends a request to receive $3^{rd}$ party media content to a satellite headend via a DSL infrastructure on a media exchange network. In step 202, the satellite headend responds to the request by sending acknowledge information to the satellite MPS via the DSL infrastructure. In step 203, the satellite MPS receives the $3^{rd}$ party media content from a satellite provider via a satellite dish antenna and consumes or stores the $3^{rd}$ party media content either locally or at a network storage location.

As an example, referring to FIG. 1, the satellite MPS 101 at the first home 102 sends a request to receive a particular $3^{rd}$ party media content (e.g., a car commercial) to the satellite headend 108. The request is transmitted from the satellite MPS 101, to the DSL modem 103, to the DSL infrastructure 107, and finally to the satellite headend 108. The satellite headend 108 processes the request and pushes acknowledge information (e.g., request received, request approved, etc.) to the satellite MPS 101. The acknowledge information is transmitted along the reverse path of the original request.

The satellite headend 108 may bill an account of the user of the satellite MPS 101 for access to the $3^{rd}$ party media content. The account may be managed in, for example, the satellite headend 108, the DSL headend 113, or the media exchange server 110, in accordance with various embodiments of the present invention.

The satellite MPS 101 receives the $3^{rd}$ party media content via the satellite dish antenna 106. The satellite MPS 101 records the 3$^{rd}$ party media content in digital form on the MP 105 which may comprise, for example, a disk storage device.

Other examples of access and media exchange are possible as well, in accordance with various embodiments of the present invention.

Figure 2B:
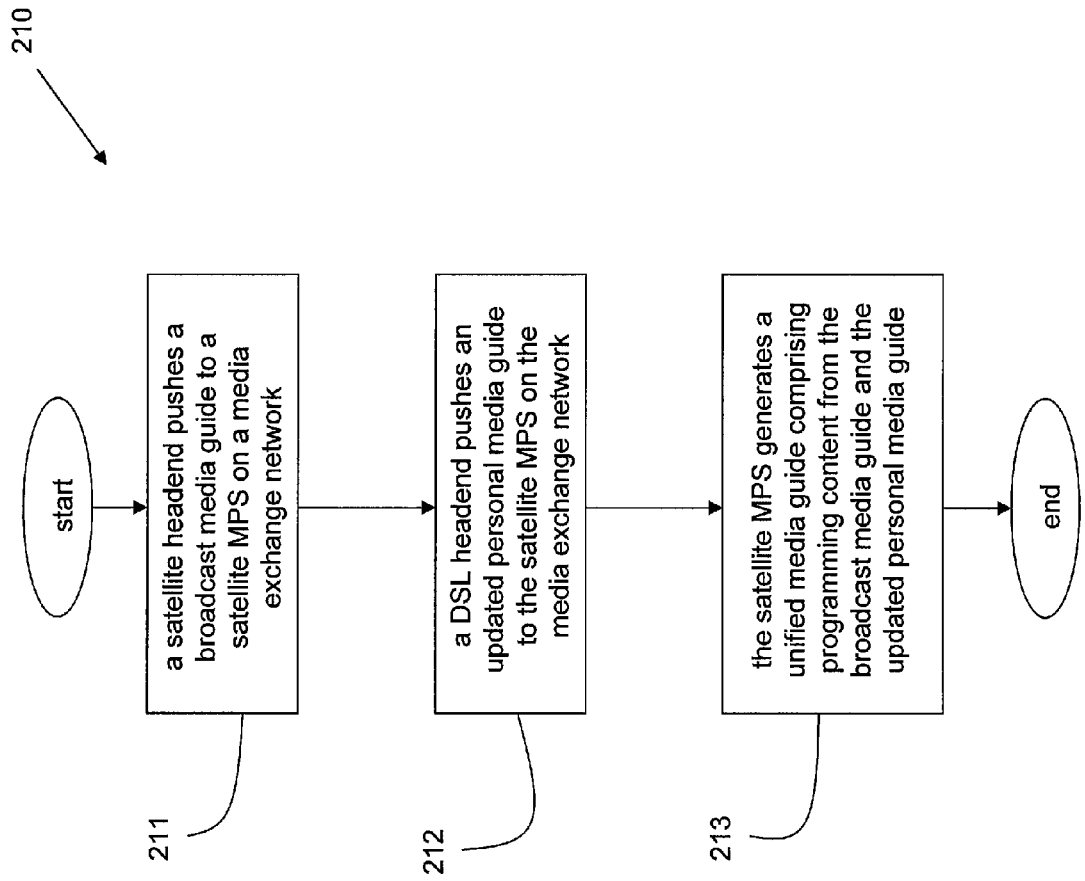
FIG. 2B is a flowchart illustrating an embodiment of a method that generates a unified media guide in the media processing system according to the present invention.

FIG. 2B is a flowchart illustrating an embodiment of a method 210 to generate a unified media guide in the media processing system 101 of FIG. 1, in accordance with various embodiments of the present invention. In step 211, a satellite headend pushes a broadcast media guide to a satellite MPS on a media exchange network. In step 212, a DSL headend pushes an updated personal media guide to the satellite MPS on the media exchange network. In step 213, the satellite MPS generates a unified media guide comprising, for example, programming content from the broadcast media guide and the updated personal media guide.

In accordance with an embodiment of the present invention, a broadcast programming guide may comprise a legacy programming guide listing scheduled broadcast programs provided by the satellite provider. A personal media guide may comprise scheduled personal media content in the form of channels such as, for example, a user's personal media channels, a friend's media channels, a family member's media channels, and/or a 3$^{rd}$ party provider's media channels.

As an example, referring to FIG. 1, the satellite headend 108 pushes a broadcast media guide, corresponding to that day's programming schedule of the satellite provider, to the satellite MPS 101 via the DSL infrastructure 107. The DSL headend 113 pushes an updated personal media guide to the satellite MPS 101 via the DSL infrastructure 107. The DSL headend may have just updated the personal media guide with channels from a family member on the media exchange network 100, for example.

The satellite MPS 101 processes the broadcast media guide and the personal media guide to generate a unified media guide comprising the program content and channels from both media guides. In other words, the unified media guide comprises both broadcast program content and personal media content in a scheduled format. A user of the satellite MPS 101 may use a remote control to view the unified media guide and select from a variety of personal and broadcast media channels.

Figure 2C:
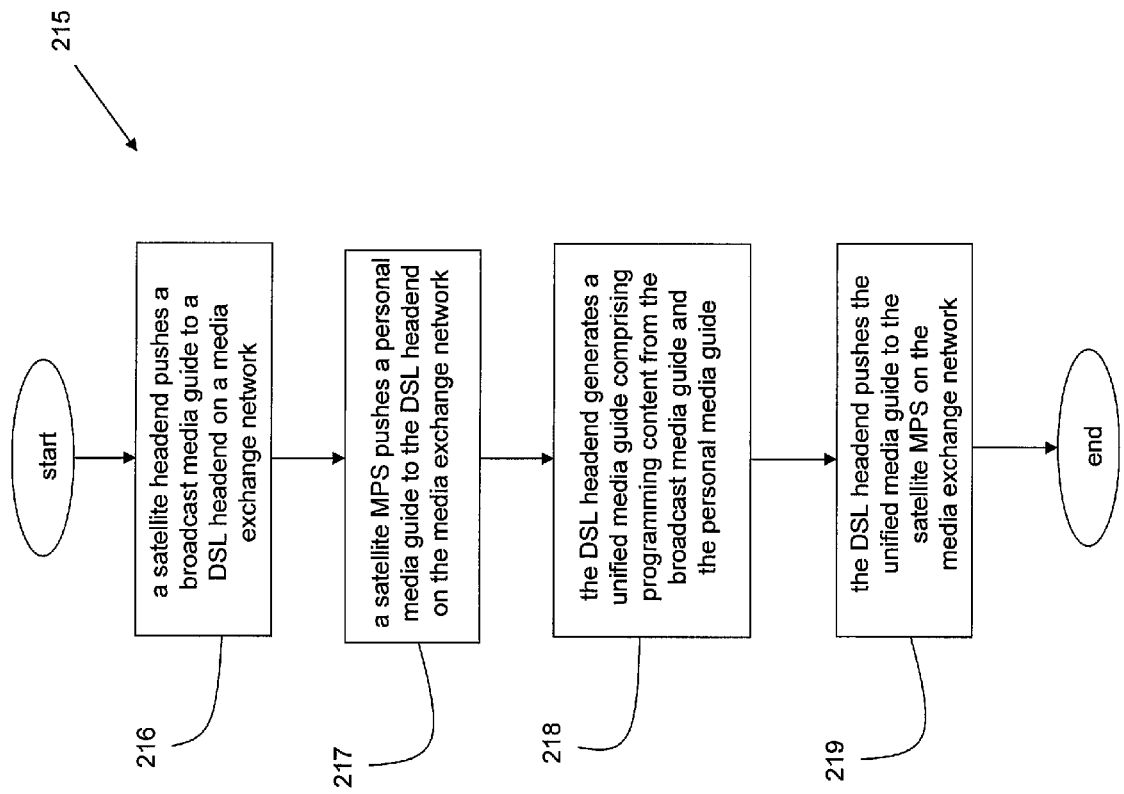
FIG. 2C is a flowchart illustrating an embodiment of a method that generates a unified media guide according to the present invention.

FIG. 2C is a flowchart illustrating an embodiment of a method 215 to generate a unified media guide in a DSL headend 113 of the media exchange network 100 of FIG. 1, in accordance with various embodiments of the present invention. In step 216, a satellite headend pushes a broadcast media guide to a DSL headend on a media exchange network. In step 217, a satellite MPS pushes a personal media guide to the DSL headend on the media exchange network. In step 218, the DSL headend generates a unified media guide comprising programming content from the broadcast media guide and the personal media guide. In step 219, the DSL headend pushes the unified media guide to the satellite MPS on the media exchange network.

As an example, referring to FIG. 1, the satellite headend 108 pushes a broadcast media guide containing that day's scheduled satellite programming content to the DSL headend 113 via the DSL infrastructure 107. The satellite MPS 101 pushes its personal media guide to the DSL headend 113 via the DSL infrastructure 107. The DSL headend processes the two media guides and generates a unified media guide comprising the program content and channels from both media guides. In other words, the unified media guide comprises both broadcast program content and personal media content in a scheduled format.

The DSL headend 113 then pushes the unified media guide to the satellite MPS 101 on the media exchange network 100 via the DSL infrastructure 107. A user of the satellite MPS 101 may use a remote control to view the unified media guide and select from a variety of personal and broadcast media channels.

Other examples of media guide exchange and generation are possible as well, in accordance with various embodiments of the present invention. For example, in one embodiment according to the present invention, the satellite MPS 101 may generate a unified media guide by processing a broadcast media guide received from the satellite headend 108 and a personal media guide residing in the satellite MPS 101. In another embodiment according to the present invention, the DSL headend 113 may generate a unified media guide by processing a broadcast media guide received from the satellite headend 108 and a personal media guide residing in the DSL headend 113. The unified media guide may then be pushed to the satellite MPS 101.

Some embodiments according to the present invention can transfer and share many different types of digital media, data, and services between one device/location and another with ease while being able to index, manage, and store the digital media and data.

For example, it may be desirable to be able to distribute and to store many types of digital media in a PC and/or a television environment in a user-friendly manner without using many different types of software applications and/or unique and dedicated interfaces. Any networking issues or other technical issues may be transparent to the users. It may also be desirable to use existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, via a TV channel guide look-and-feel user interface. The media exchange network also allows a user to construct personal media channels that comprise personal digital media (e.g., captured digital pictures, digital video, digital audio, etc.), request that third-party media channels be constructed from third-party digital media, and access the media channels pushed to the user by other users on the media exchange network.

PC's may be used, but are not required, to interface to the media exchange network for the purpose of exchanging digital media, data, and services. Set-top boxes or integrated MPS's may be used with the media exchange network to perform some or all of the previously described media exchange functions using, for example, a remote control with a television screen.

Set-top boxes may be software enhanced to create an MPS that provides full media exchange network interfacing and functionality via a TV screen with a TV guide look-and-feel. PC's may be software enhanced and may provide the same TV guide look-and-feel. Therefore, the media exchange network may support both PC's and MPS's in a similar manner. In accordance with an embodiment of the present invention, a fully integrated MPS may be designed from the ground up, having full MPS capability.

In the case of an MPS configuration, the user may use a remote control and a TV screen to access the media exchange network. In the case of a PC configuration, the user may use a keyboard and/or a mouse to access the media exchange network.

An MPS or an enhanced PC may provide, for example, a storage and distribution platform for the exchange of personal and third party digital media, data, and services as well as for bringing the conventional television channels to a user's home. An MPS and/or a PC may connect to the media exchange network via an existing communication infrastructure which may include, for example, a cable infrastructure, a DSL infrastructure, a satellite infrastructure, etc. The connection to the communication infrastructure may be hard-wired or wireless.

The media exchange network may allow users to effectively become their own broadcasters from their own homes by creating their own media channels and pushing those media channels to other authorized users on the media exchange network, such as friends and family members.

Figure 3:
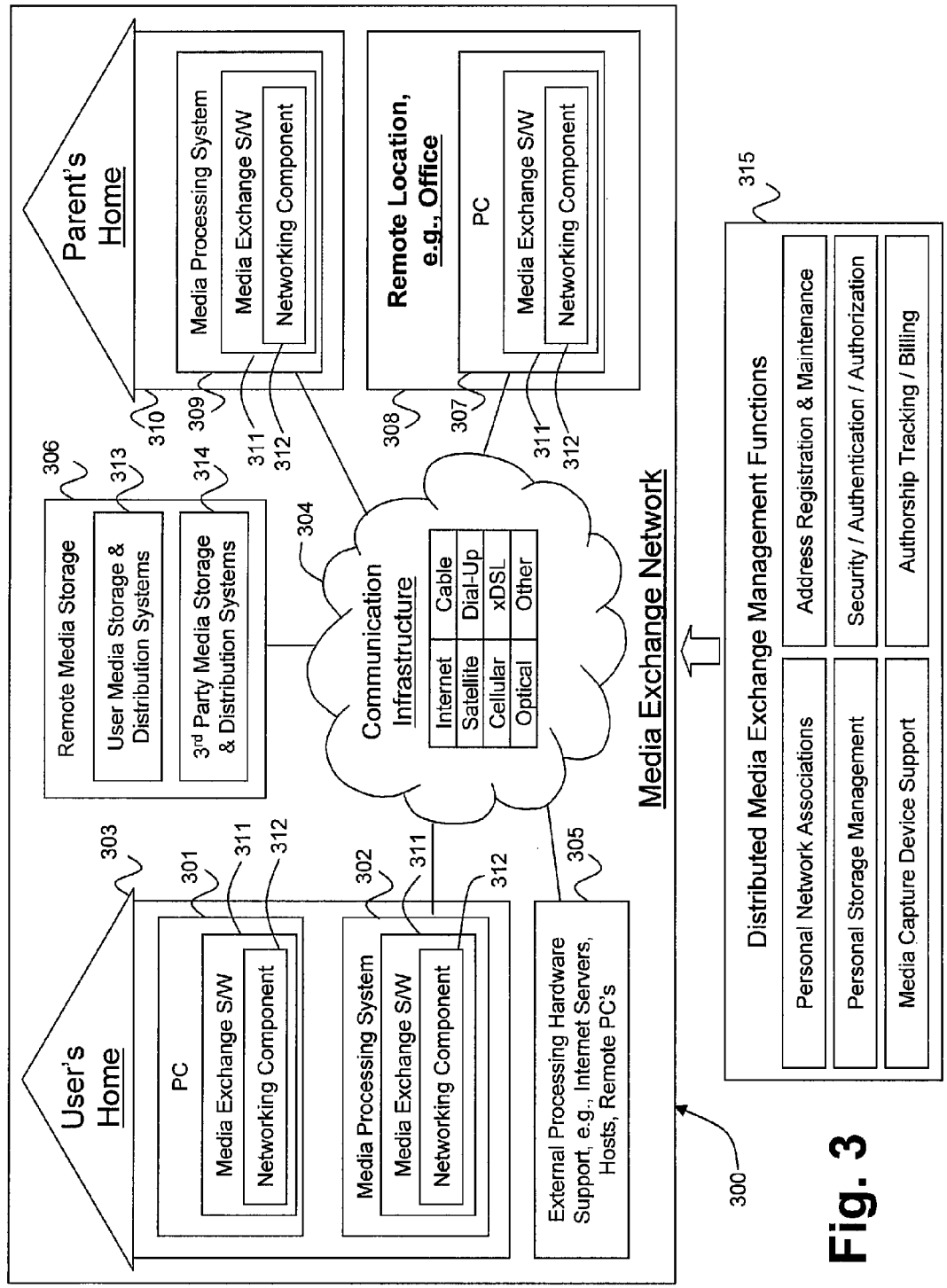
FIG. 3 is a schematic block diagram illustrating an embodiment of a media exchange network according to the present invention.

FIG. 3 illustrates a media exchange network 300 for exchanging and sharing digital media, data, and services in accordance with an embodiment of the present invention. The media exchange network 300 may comprise, for example, a secure, closed network environment that is only accessible to pre-defined users and service providers. The media exchange network of FIG. 3 comprises a first PC 301 and a first MPS 30.2 at a user's home 303, a communication infrastructure 304, an external processing hardware support 305, a remote media storage 306, a second PC 307 at a remote location 308 such as an office, and a second MPS 309 at a parent's home 310.

The PC's 301 and 307 and the MPS's 302 and 309 may each include a media exchange software (MES) platform 311 and a networking component 312 for connectivity. The MES platform 311 provides multiple capabilities including, for example, media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 may comprise, for example, at least one server such as a centralized Internet server, a peer-to-peer server, or a cable head end. The server may alternatively be distributed over various hosts or remote PC's. The MES platform 311 may reside on the external processing hardware support server 305. The remote media storage 306 may comprise, for example, user media storage and distribution systems 313 and/or third party media storage and distribution systems 314.

The communication infrastructure 304 may comprise, for example, at least one of an Internet infrastructure, a satellite infrastructure, a cable infrastructure, a dial-up infrastructure, a cellular infrastructure, an xDSL, infrastructure, an optical infrastructure, or some other infrastructure. The communication infrastructure 304 may link the user's home 303, the parent's home 310, the remote media storage 306, and the remote location office 308 to each other (e.g., the communication infrastructure 304 may link all users and service providers of the media exchange network 300).

The various functions 315 of the media exchange network 300 may comprise, for example, generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated into the PC 301 at the user's home 303.

Figure 4:
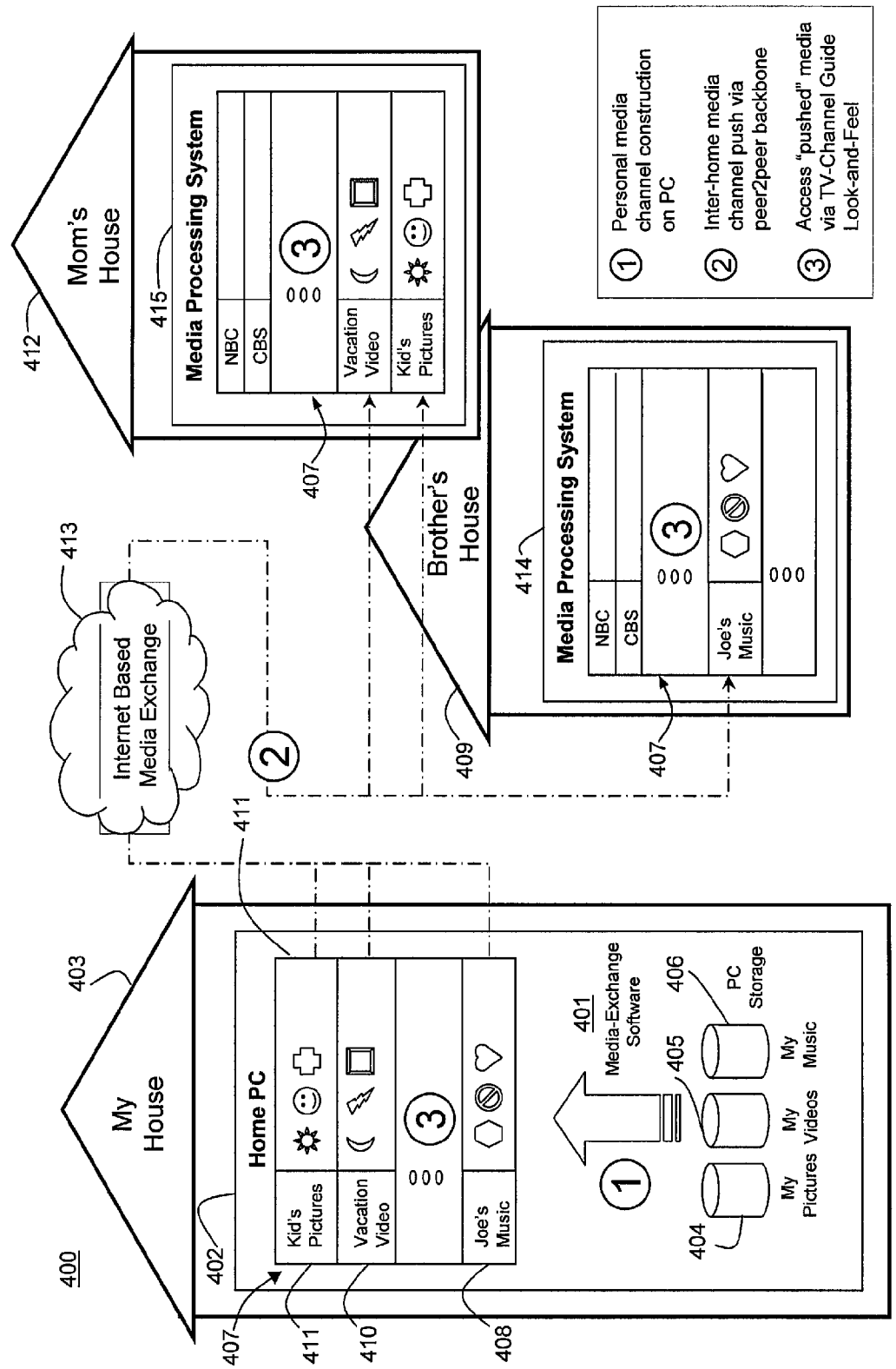
FIG. 4 is a schematic block diagram illustrating an exchange of personal media over a media exchange network according to an embodiment of the present invention.

FIG. 4 illustrates an example of a personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the Internet-based media exchange network 400, "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
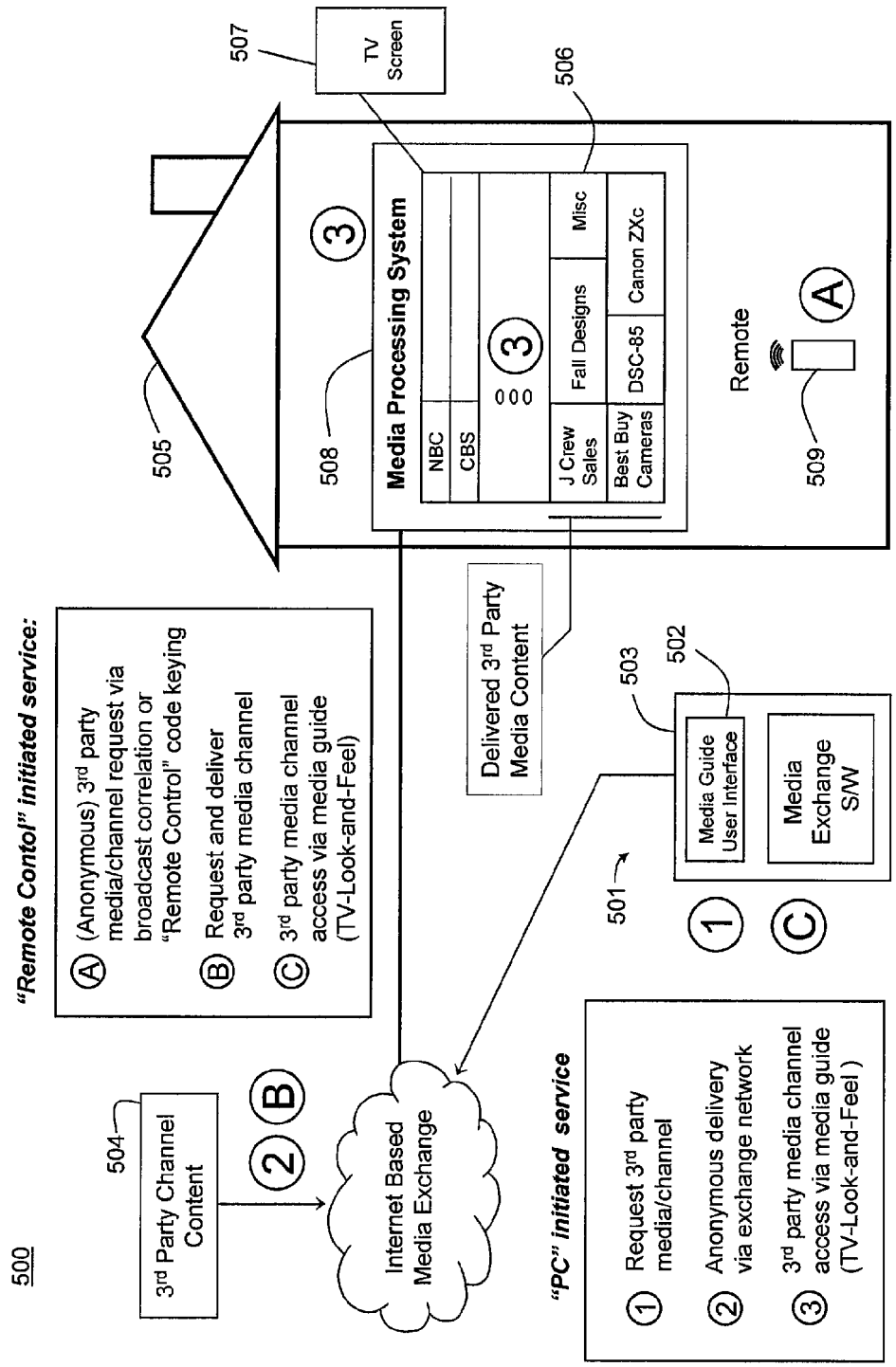
FIG. 5 is a schematic block diagram illustrating an exchange of third-party media over a media exchange network according to an embodiment of the present invention.

FIG. 5 illustrates an example of a third-party media exchange over a media exchange network 500 in accordance with an embodiment of the present invention. In step 1, a PC-initiated third-party request is made by a first party 501 via an Internet-based media exchange network 500 using a TV channel guide look-and-feel user interface 502 on a PC 503. In step 2, an anonymous delivery of the requested third-party channel 504 is made to a second party 505 via the Internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an Internet-based media exchange network 500 using a TV channel guide look-and-feel user interface 506 on a TV screen 507 using a remote control 509. The second party 505 may key in a code, using the remote control 509, that is correlated to a commercial or some other third party broadcast media. In step B, an anonymous delivery of the requested third-party channel 504 is made to a first party 501 via the Internet-based media exchange network 500. In step C, the first party 501 accesses the third-party channel 504 using a TV channel guide look-and-feel user interface 502 on a PC 503.

Figure 6:
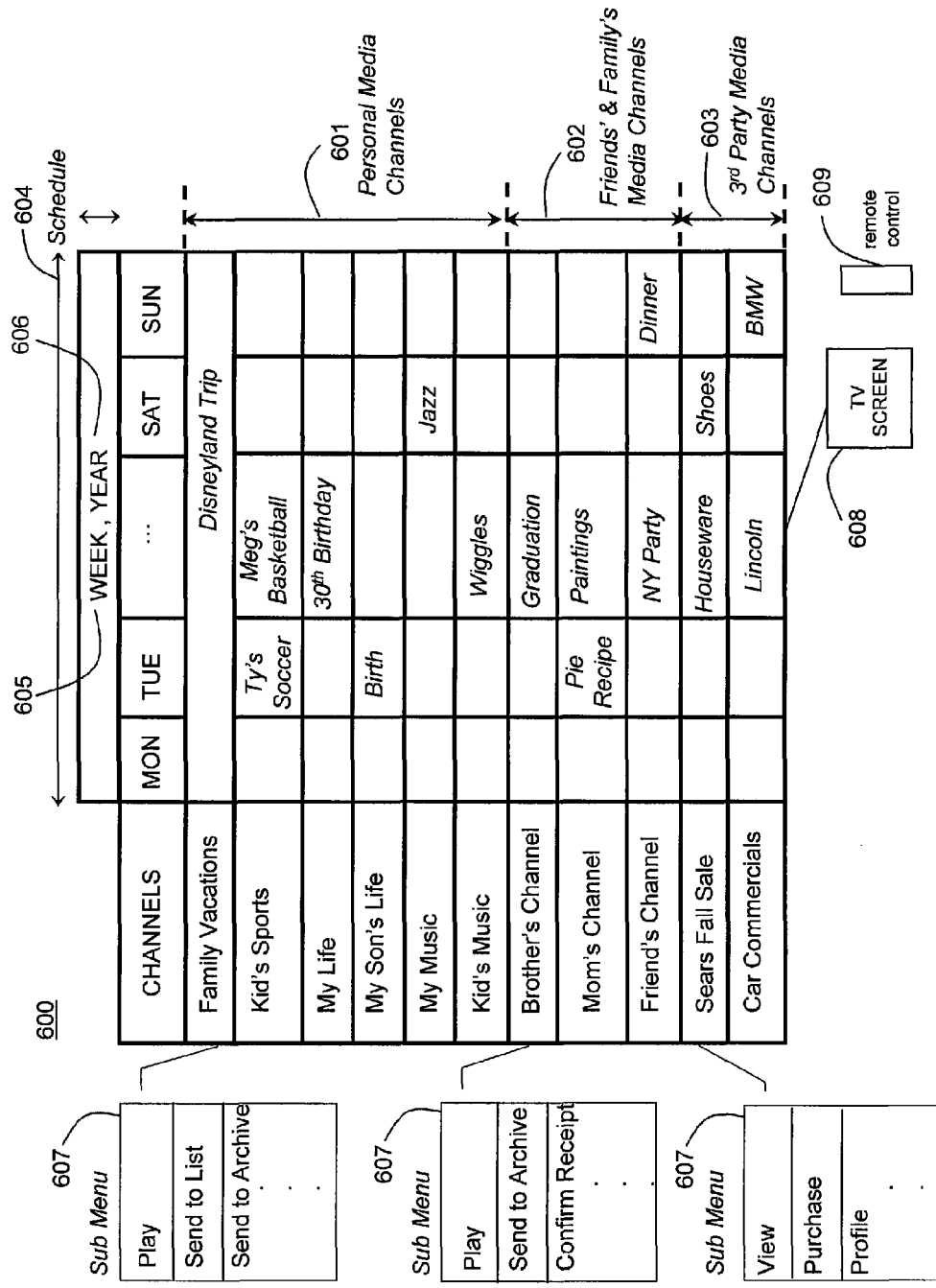
FIG. 6 illustrates an embodiment of a television (TV) guide channel user interface according to the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or a mouse.

The TV channel guide user interface 600 may be configured not only for conventional TV channels, but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel".

The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as, for example, "play", "send to list", "send to archive", "confirm receipt", "view", "purchase", and "profile".

Figure 7:
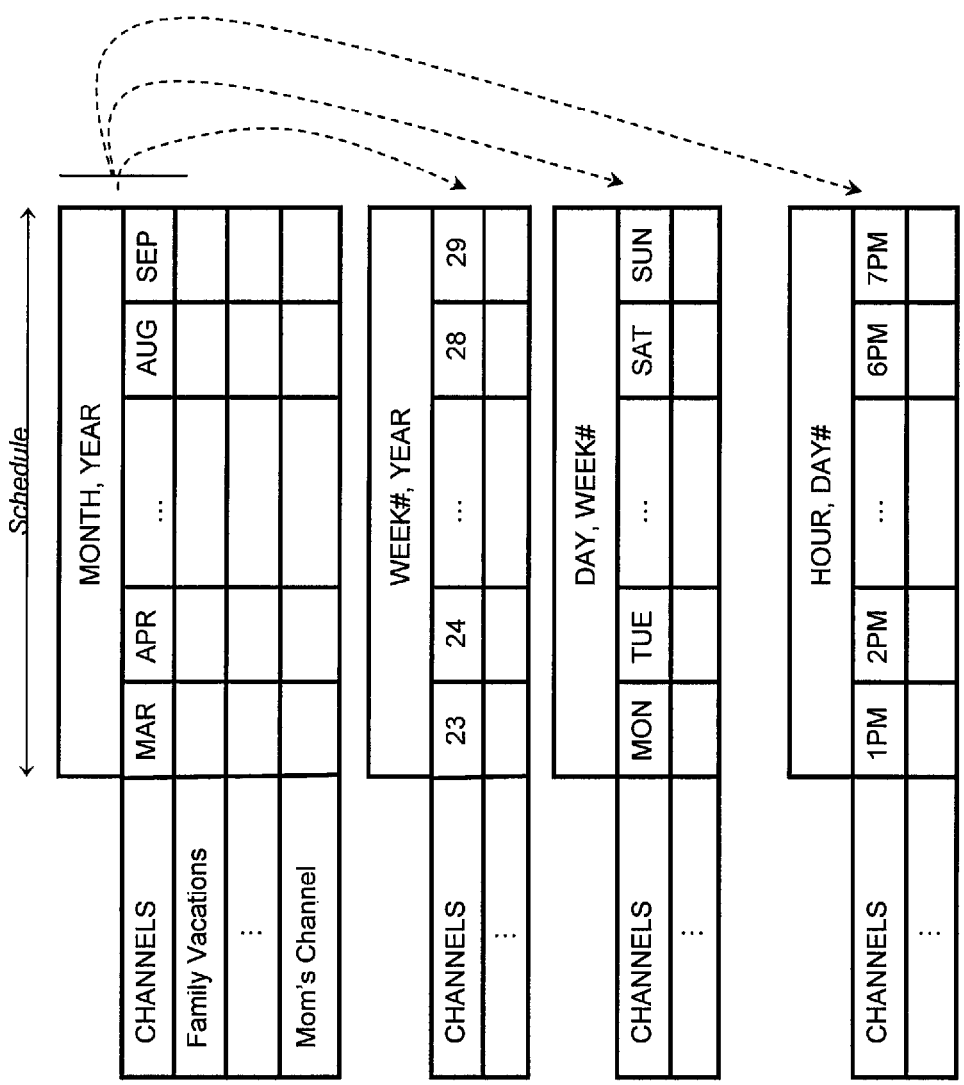
FIG. 7 illustrates an embodiment of a TV guide channel user interface according to the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for accepting and downloading the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing may comprise, for example, buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
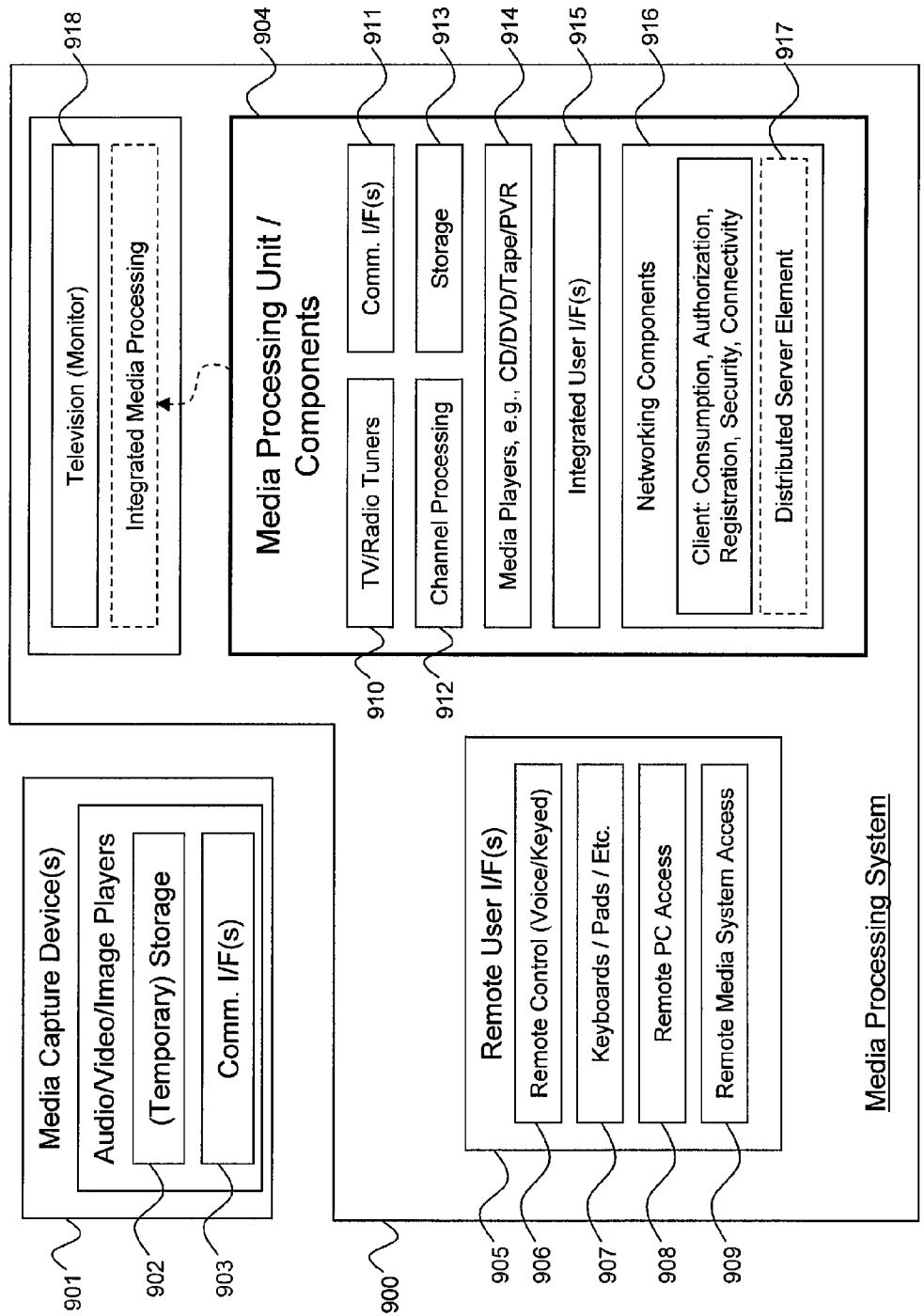
FIG. 9A is a schematic block diagram illustrating an embodiment of a media processing system (MPS) interfacing to media capture peripherals according to the present invention.

FIG. 9A illustrates some elements of a media processing system (MPS) 900 and media capture devices 901 in accordance with an embodiment of the present invention. The media capture devices 901 may comprise, for example, audio, video, and image players, such as digital cameras, digital camcorders, and MP3 players, that each may include, for example, a temporary storage area 902 and a communication interface 903 such as, for example, a wired interface (e.g., a USB interface) or a wireless interface. The media capture devices 901 may interface to an MPS and a PC.

The MPS 900 may comprise, for example, a media processing unit (MPU) 904, remote user interface(s) 905, and a TV screen 918 to provide integrated media processing capability and indirect user interface capability. The remote user interfaces 905 may comprise, for example, a voice or keyed remote control 906, keyboards and pads 907, a remote PC access interface 908, and a remote media system access interface 909 (e.g., providing access from another MPS).

The media processing unit (MPU) 904 may comprise, for example, TV and radio tuners 910 for image and audio consumption, communications interfaces 911, channel processing 912 (e.g., creating, storing, indexing, and viewing), storage 913, media players 914 (e.g., CD players, DVD players, tape players, PVRs, and MP3 players), an integrated user interface 915 (e.g., to provide a TV channel guide look-and-feel), networking components 916 to provide client functions such as, for example, consumption (e.g., billing), authorization (e.g., using digital certificates and digital ID's), registration, security, and connectivity. In accordance with an embodiment of the present invention, the networking components 916 may include a distributed server element 917 that is part of a distributed server.

Figure 9B:
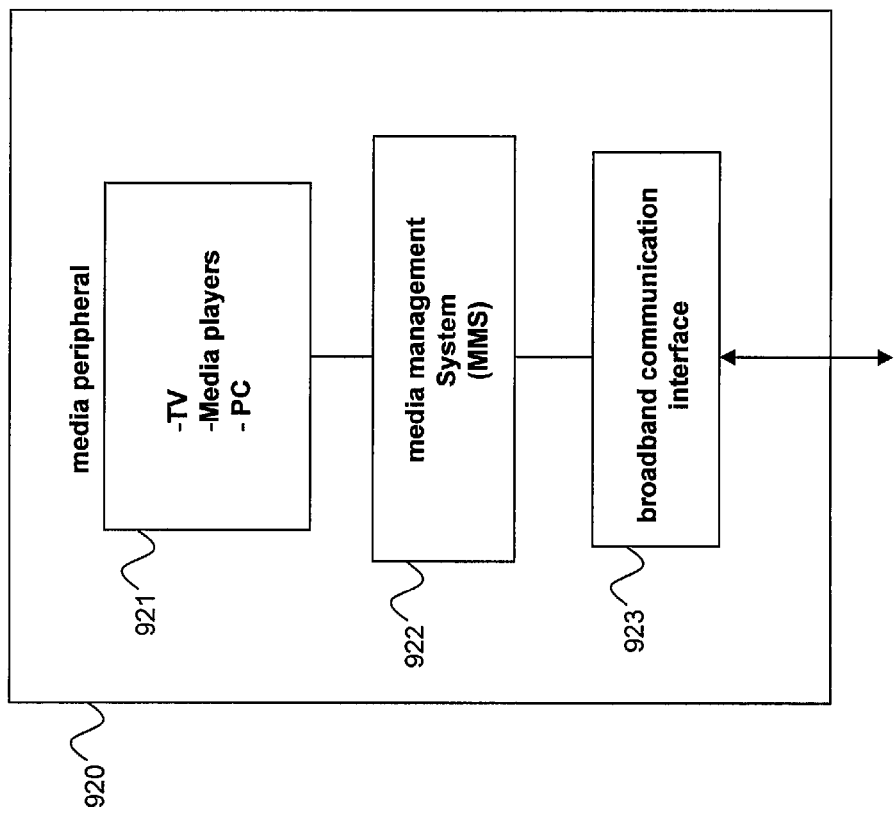
FIG. 9B illustrates an embodiment of an MPS according to the present invention.

FIG. 9B illustrates an embodiment of a media processing system (MPS) 920 in accordance with various aspects of the present invention. The MPS 920 may comprise, for example, an enhanced set-top box for viewing and interacting with various user interfaces, media, data and services that are available on the media exchange network using, for example, a remote control. The MPS 920 may comprise, for example, a media peripheral 921, a media management system (MMS) 922 and a broadband communication interface 923.

The media peripheral 921 may include, for example, a TV, a PC and media players (e.g., a CD player, a DVD player, a tape player and an MP3 player) for video, image and audio consumption of broadcast channels and/or personal channels. The broadband communication interface 923 may include, for example, internal modems (e.g., a cable modem or a DSL modem) or other interface devices to communicate with, for example, a cable or satellite headend.

The MMS 922 may include a software platform to provide functionality including, for example, media "push" capability, media "access" capability, media channel construction/selection, image sequence selection, text and voice overlay, channel and program naming, inter-home routing selection, authorship and media rights management, shared inter-home media experience, billing service and a media guide user interface providing an integrated TV channel guide look-and-feel.

Figure 10:
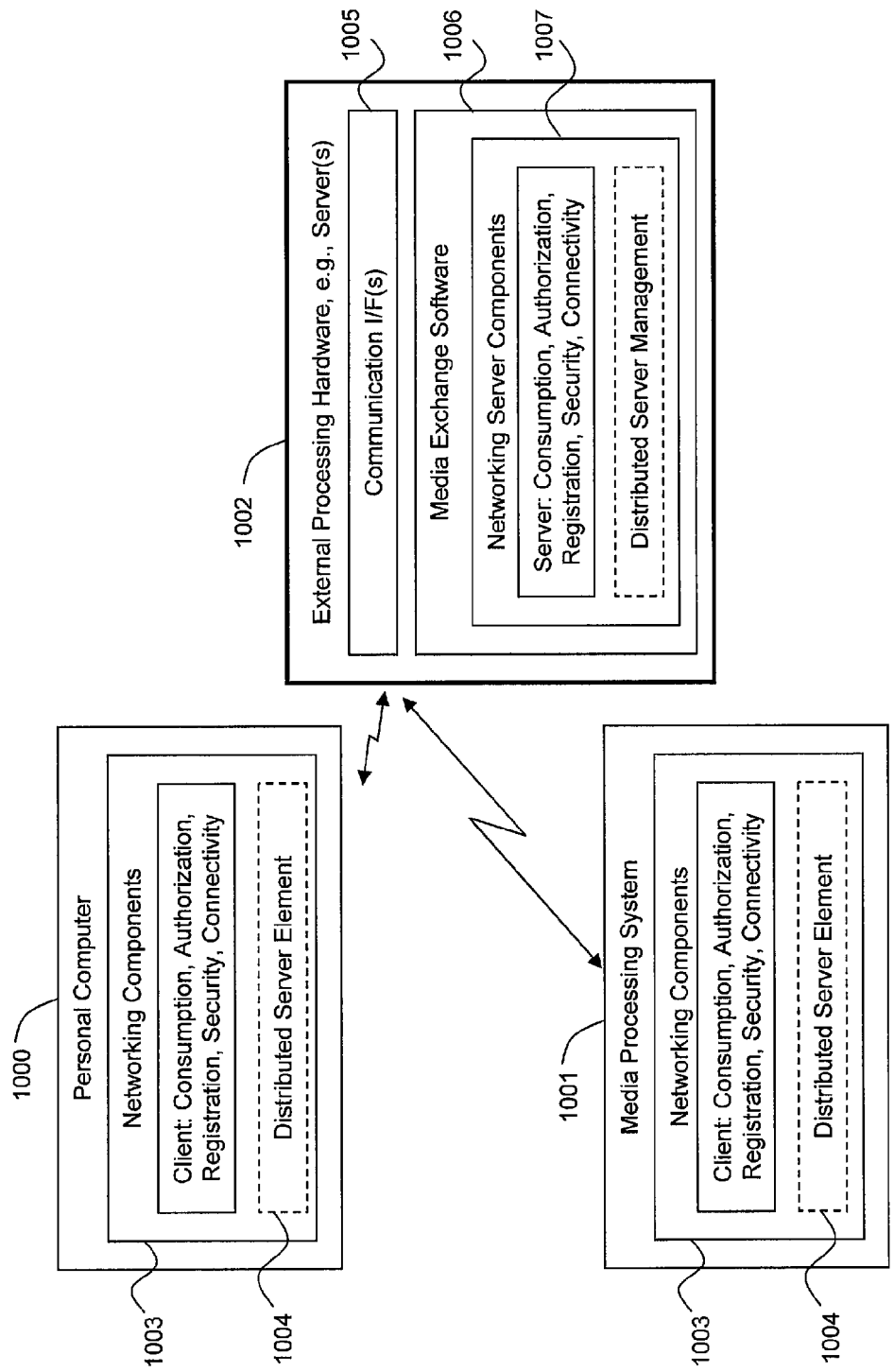
FIG. 10 is a schematic block diagram illustrating an embodiment of a personal computer (PC) and an MPS interfacing to a server on a media exchange network according to the present invention.

FIG. 10 illustrates connectivity between a PC 1000, an MPS 1001, and an external processing hardware 1002 (e.g., a server) in accordance with an embodiment of the present invention. The PC 1000 and the MPS 1001 may include networking components 1003 to provide client functions such as, for example, consumption (e.g., billing), authorization, registration, security, and connectivity. In accordance with various embodiments of the present invention, the PC 1000 and the MPS 1001 may include a distributed server element 1004 that is part of a distributed server.

The PC 1000 and the MPS 1001 may connect to the external processing hardware 1002 via wired connections or wireless connections in accordance with various embodiments of the present invention. The external processing hardware 1002 may comprise, for example, a distributed server or a peer-to-peer server. The external processing hardware 1002 also may comprise communication interfaces 1005 (e.g., cable interfaces, optical interfaces, etc.) and a media exchange software (MES) platform 1006. The MES platform 1006 in the external processing hardware 1002 may allow for communication with the PC 1000 and the MPS 1001 which may also use the same MES platform 1006. The external processing hardware 1002 may also include networking server components 1007 to provide the similar client functions such as, for example, consumption (e.g., billing), authorization, registration, security, and connectivity at the server side.

Figure 11:
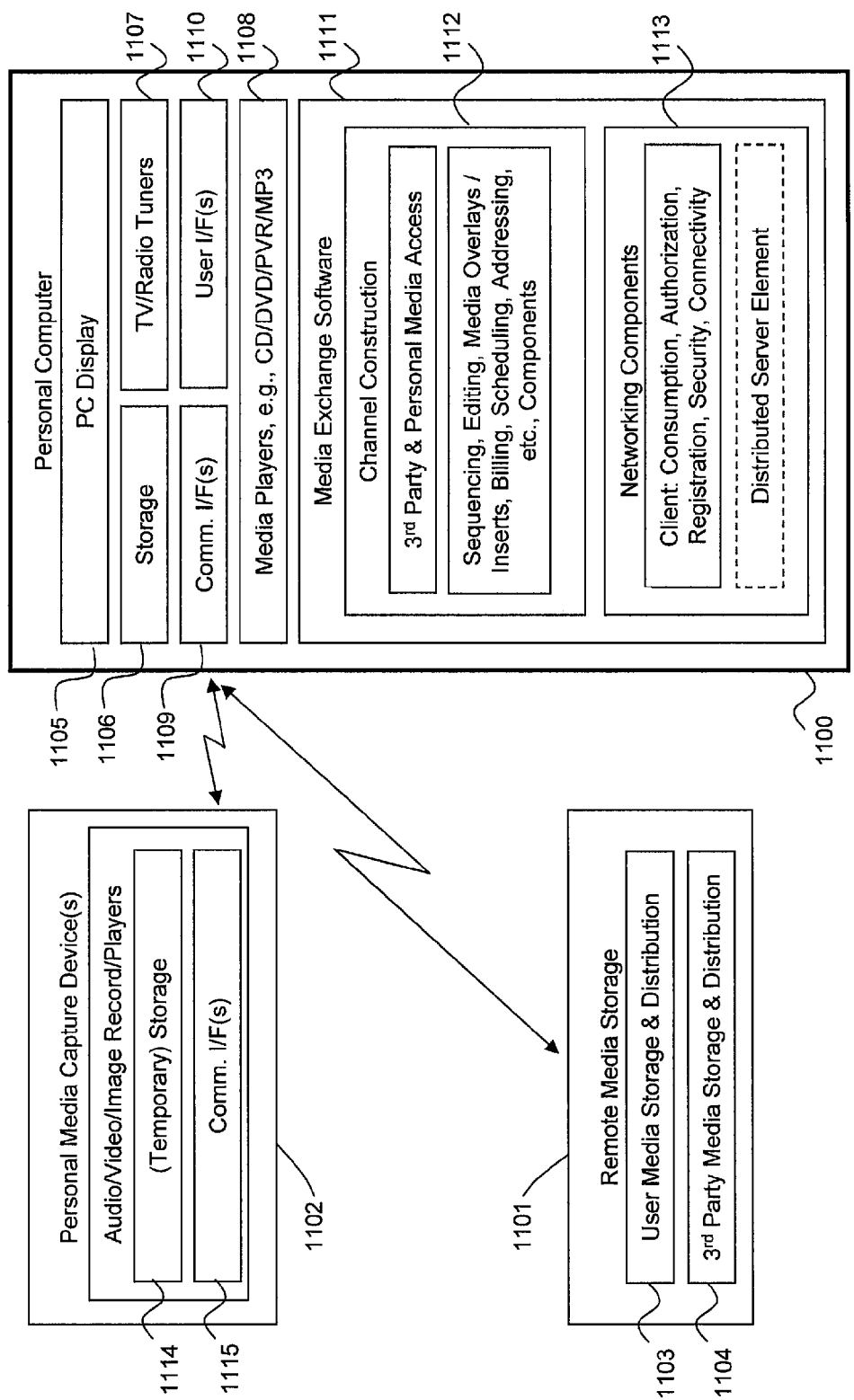
FIG. 11 is a schematic block diagram illustrating an embodiment of a PC interfacing to personal media capture devices and remote media storage on a media exchange network according to the present invention.

FIG. 11 illustrates connectivity between a PC 1100, a remote media storage 1101, and personal media capture devices 1102 when the PC 1100 is used as the primary distributor of digital media such as in the case of a PC-to-PC operation, in accordance with an embodiment of the present invention. The personal media capture devices 1102 and the remote media storage 1101 may connect to the PC 1100 via a wireless connection or a wired connection. The remote media storage 1101 may provide user media storage and distribution 1103 as well as third party media storage and distribution 1104. The personal media capture devices 1102 may provide temporary storage 1114 and communication interfaces 1115.

Viewing may be done using a PC monitor 1105 instead of a television screen in accordance with various embodiments of the present invention. The PC 1100 may include, for example, storage 1106, TV/radio tuners 1107 for media consumption, media players 1108, and communication interfaces 1109 and user interfaces 1110 similar to those for the MPS of FIG. 9. The PC 1100 may include a media exchange software (MES) platform 1111 that provides channel construction capability 1112 and networking capability 1113. The channel construction capability 1112 may provide, for example, third party and personal media access, sequencing, editing, media overlays and inserts, billing, scheduling, and addressing.

In summary, some embodiments of the present invention may relate to systems and methods that support a media processing system based on a satellite set-top box platform. The media processing system may provide telephony downstream and upstream data paths on a media exchange network.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A communications system, comprising:
   one or more devices configured to provide two-way communications with a network, wherein the network comprises Internet infrastructure, wherein the one or more devices are configured to provide one-way communications with an antenna,
   wherein the one or more devices are configured to receive broadcast media content from the antenna and from the network,
   wherein the one or more devices are configured to send the received broadcast media content and personal media content to the network, the personal media content being different from the received broadcast media content,
   wherein the one or more devices are configured to provide a plurality of media channels by which to access the received broadcast media content and the personal media content, and
   wherein the one or more devices are configured to push a selected media channel of the plurality of media channels over the network.

2. The communications system according to claim 1, wherein the antenna comprises a dish antenna.

3. The communications system according to claim 1, wherein the one or more devices support a software platform that provides one or more of the following: a user-interface functionality, a distributed storage functionality and a networking functionality.

4. The communications system according to claim 1, wherein the one or more devices support a software platform that provides one or more of the following: device registration, channel setup, program setup, management and security.

5. The communications system according to claim 1, wherein the one or more devices are configured to provide one or more of the following: a distributed networking capability, an archival functionality, a temporary storage capability, a storage manager and a digital rights manager.

6. The communications system according to claim 1, wherein the network comprises a telephony network, and wherein the one or more devices are configured to provide two-way communications with the telephony network.

7. The communications system according to claim 1, wherein the network comprises a telephony network, a telephony network headend and a satellite system headend, wherein the one or more devices are configured to provide two-way communications with the telephony network headend via the telephony network, and wherein the one or more devices are configured to provide two-way communications with the satellite system headend via the telephony network.

8. A home network, comprising:
   one or more devices configured to provide two-way communications with a network, wherein the network comprises Internet infrastructure, wherein the one or more devices are configured to provide one-way communications with an antenna,
   wherein the one or more devices are configured to receive broadcast media content from the antenna and from the Internet infrastructure,
   wherein the one or more devices are configured to send the received broadcast media content and personal media content to the Internet infrastructure, the personal media content being different from the received broadcast media content,
   wherein the one or more devices are configured to provide a plurality of media channels by which to access the received broadcast media content and the personal media content, and
   wherein the one or more devices are configured to push a selected media channel of the plurality of media channels over the Internet infrastructure.

9. The home network according to claim 8, wherein the antenna comprises a dish antenna.

10. The home network according to claim 8, wherein the one or more devices support a software platform that provides one or more of the following: a user-interface functionality, a distributed storage functionality and a networking functionality.

11. The home network according to claim 8, wherein the one or more devices support a software platform that provides one or more of the following: device registration, channel setup, program setup, management and security.

12. The home network according to claim 8, wherein the one or more devices are configured to provide one or more of the following: a distributed networking capability, an archival functionality, a temporary storage capability, a storage manager and a digital rights manager.

13. The home network according to claim 8, wherein the network comprises a telephony network, and wherein the one or more devices are configured to provide two-way communications with the telephony network.

14. The home network according to claim 8, wherein the network comprises a telephony network, a telephony network headend and a satellite system headend, wherein the one or more devices are configured to provide two-way communications with the telephony network headend via the telephony network, and wherein the one or more devices are configured to provide two-way communications with the satellite system headend via the telephony network.

15. The home network according to claim 11, wherein the telephony network comprises a DSL infrastructure, and wherein the one or more devices provide two-way communications with the DSL headend via a DSL modem and the DSL infrastructure.

16. The home network according to claim 14, wherein the one or more devices receive a broadcast media guide from the satellite system headend, wherein the one or more devices receive a personal media guide from the telephony network headend, and wherein the one or more devices generate a unified media guide by processing the received broadcast media guide and the received personal media guide.

17. The home network according to claim 14, wherein telephony network headend receives a broadcast media guide from the satellite system headend, wherein telephony network headend receives a personal media guide from the one or more devices, and wherein telephony network headend generates a unified media guide by processing the received broadcast media guide and the received personal media guide.

18. The home network according to claim 14, wherein the telephony network headend comprises a digital subscriber line (DSL) headend.

19. The home network according to claim 17, wherein the telephony network headend sends the unified media guide to the one or more devices.

20. A communication device, comprising:
one or more devices configured to provide two-way communications with a network, wherein the network comprises Internet infrastructure and telephone infrastructure,
wherein the one or more devices are configured to provide one-way communications with an antenna, wherein the one or more devices are configured to receive broadcast media content from the antenna and from the network,
wherein the one or more devices are configured to send the received broadcast media content and personal media content to the network, the personal media content being different from the received broadcast media content,
wherein the one or more devices are configured to provide a plurality of media channels by which to access the received broadcast media content and the personal media content, and
wherein the one or more devices are configured to push a selected media channel of the plurality of media channels over the network.

\* \* \* \* \*